United States Patent
Chiang et al.

(10) Patent No.: US 10,383,164 B2
(45) Date of Patent: Aug. 13, 2019

(54) NETWORK TERMINAL HAVING CONFIGURABLE RETRY OR CHANGEOVER

(71) Applicant: T-Mobile USA, Inc., Bellevue, WA (US)

(72) Inventors: Hsin-Fu Henry Chiang, Bellevue, WA (US); Boris Antsev, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 66 days.

(21) Appl. No.: 15/287,194

(22) Filed: Oct. 6, 2016

(65) Prior Publication Data
US 2018/0103500 A1 Apr. 12, 2018

(51) Int. Cl.
H04W 76/19 (2018.01)
H04L 29/06 (2006.01)
H04W 76/18 (2018.01)

(52) U.S. Cl.
CPC .......... *H04W 76/19* (2018.02); *H04L 65/105* (2013.01); *H04L 65/1006* (2013.01);
(Continued)

(58) Field of Classification Search
CPC . H04W 76/028; H04W 76/027; H04W 76/19; H04W 76/18; H04L 65/105; H04L 65/1073; H04L 65/1006; H04L 65/1016
(Continued)

(56) References Cited

U.S. PATENT DOCUMENTS

| | | | |
|---|---|---|---|
| 2004/0028081 A1* | 2/2004 | Chang | H04W 76/15 370/490 |
| 2004/0259528 A1* | 12/2004 | Gandhi | H04W 48/06 455/411 |

(Continued)

FOREIGN PATENT DOCUMENTS

WO WO2015044664 4/2015

OTHER PUBLICATIONS

"CSCF in VoLTE—The P-CSCF (Part 1 of 4)", Expert Opinion-LTE University, retrieved Jul. 14, 2016, from <<http://lteuniversity.com/get_trained/expert_opinion1/b/lpafterson/archive/2013/06/12/cscf-in-volte-the-p-cscf-part-1-of-4.aspx>>, 2 pages.
(Continued)

*Primary Examiner* — Obaidul Huq
(74) *Attorney, Agent, or Firm* — Lee & Hayes, P.C.

(57) ABSTRACT

In some implementations, a terminal, e.g., of a wireless telecommunications network, can receive information of at least two anchoring devices. The terminal can commence respective transactions with the anchoring devices via the network and determine that the respective transactions have failed. The terminal can then receive information of an additional anchoring device and commence a transaction with the additional anchoring device. In some examples, the terminal can commence transactions with a first anchoring device, then a second anchoring device in response to a transaction failure, then with the first anchoring device again in response to another transaction failure. In some examples, the terminal can commence a first transaction with the first anchoring device and determine that the first transaction has failed. The terminal can commence another transaction with the second anchoring device in response to an error reply, or with a third anchoring device in response to a timeout.

13 Claims, 9 Drawing Sheets

(52) U.S. Cl.
CPC ...... *H04L 65/1016* (2013.01); *H04L 65/1073* (2013.01); *H04W 76/18* (2018.02)

(58) Field of Classification Search
USPC .......................................... 370/216, 225, 228
See application file for complete search history.

(56) References Cited

U.S. PATENT DOCUMENTS

| | | | |
|---|---|---|---|
| 2010/0150137 A1* | 6/2010 | Lu ..................... | H04L 29/06217 370/352 |
| 2010/0165833 A1 | 7/2010 | Du et al. | |
| 2012/0215930 A1 | 8/2012 | Stenfelt et al. | |
| 2015/0124588 A1 | 5/2015 | Hallenstal et al. | |
| 2015/0195864 A1* | 7/2015 | Bartolome Rodrigo ..................... | H04W 76/38 370/221 |
| 2016/0029228 A1 | 1/2016 | Mufti | |

OTHER PUBLICATIONS

"ETSI TS 124 229 v 13.5.1. Technical Specification", May 2016, pp. 83-100, 135-151, 426-428 and 784-800.

Jennings, C., et al., "Managing Client-Initiated Connections in the Session Initiation Protocol (SIP)", Standards Track, RFC 5626, 50 pages.

"P-CSCF: An Introduction—The IMS Jungle", retreived Jul. 14, 2016, from <<https://theimsjungle.wordpress.com/2008/04/30/p-cscf-an-introduction/>, 4 pages.

Schulzrinne, H., "Dynamic Host Configuration Protocol (DHCP-for-IPv4) Option for Session Initiation Protocol (SIP) Servers", Standards Track, RFC 3361, Aug. 2002, 7 pages.

3GPP; TSGNCT; "IMS Restoration Procedures (Release 14)", 3GPP TS 23380 v14.0.0, Sep. 2016, 44 pgs.

PCT Search Report and Written Opinion dated Jan. 12, 2018 for PCT Application No. PCT/US17/53310, 13 pages.

* cited by examiner

NETWORK TERMINAL HAVING CONFIGURABLE RETRY OR CHANGEOVER

BACKGROUND

Many computing devices configured for telecommunications, such as cellular telephones, can communicate via a variety of networks. Cellular and other portable communications devices may connect with networks of varying status or functionality either within a communication session or between communication sessions. Network operators often provision backup components to provide network service in the event that primary components fail. Examples of components having backups can include servers or network links.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. For brevity of illustration, in the diagrams herein, an arrow beginning with a diamond connects a first component or operation (at the diamond end) to at least one second component or operation that is or can be included in the first component or operation.

DETAILED DESCRIPTION

Overview

Figure 1:
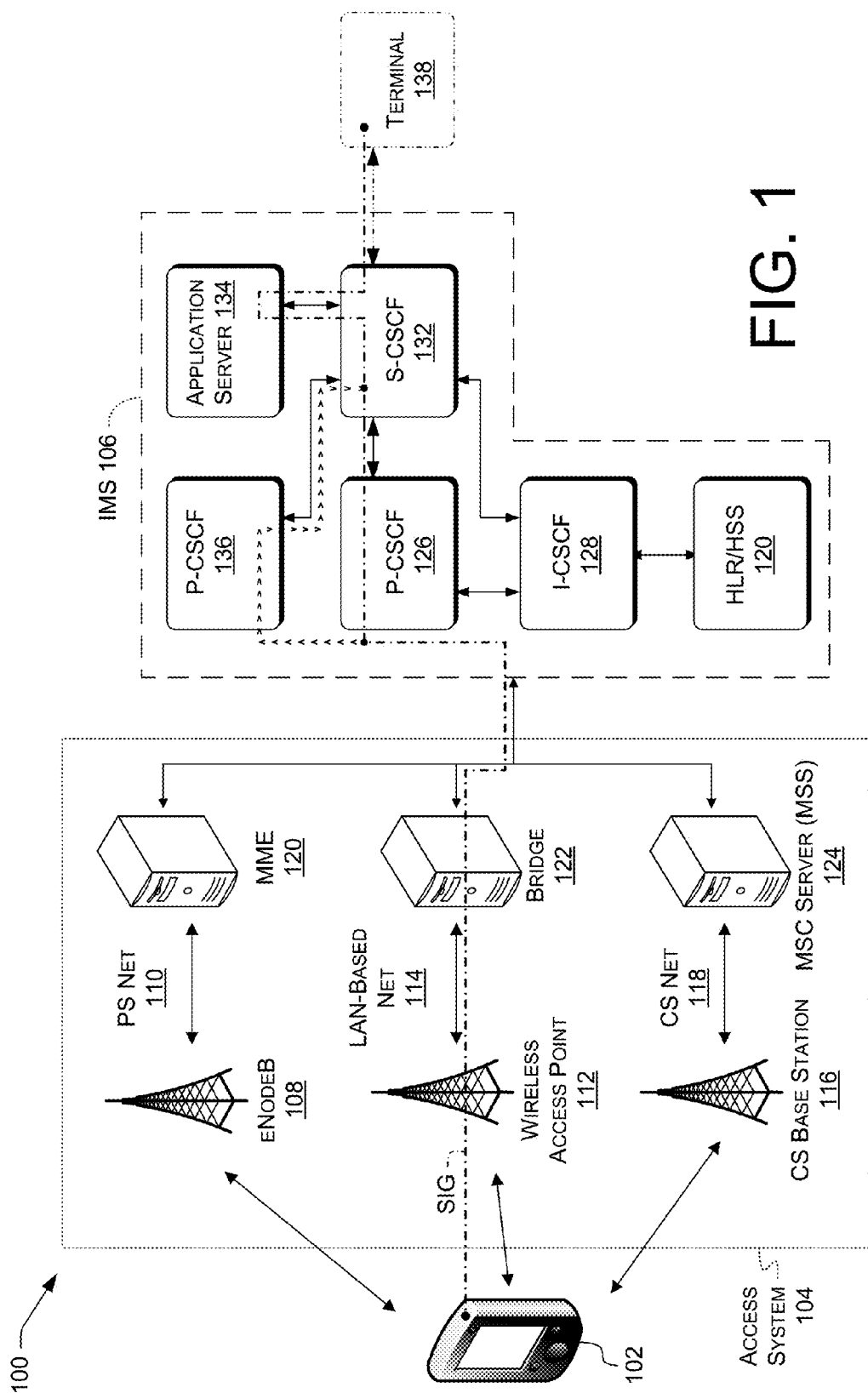
FIG. 1 illustrates an example telecommunication system, including components used to perform retry or changeover with respect to anchoring device(s) of a network.

In some telecommunications networks, calls (or other communication sessions) are placed from an originating (MO) terminal to a terminating (MT) terminal. In some example networks, all calls pass through an Internet Protocol (IP) Multimedia Subsystem (IMS) or other core network associated with the MO terminal. In some of these networks, an anchoring device, e.g., an IMS proxy call session control function (P-CSCF), associated with the MO terminal routes signaling traffic of the call. As a result, if a P-CSCF fails, terminals will not be able to place calls or use other services via the IMS. For brevity herein, "failure" includes any condition that renders an anchoring device unable to provide services to a terminal. For example, references to failure of a P-CSCF may include actual hardware or software malfunctions of the P-CSCF, overload conditions in which the P-CSCF does not timely process or respond to messages from the terminal, failures or overload of intervening components between the terminal and a P-CSCF such as routers or gateways, or link failures or overloads that prevent data from timely traveling between the terminal and the P-CSCF.

Terminals are often configured with a list of candidate P-CSCFs with which the terminal can attempt to communicate. However, some schemes provision these lists statically. If all the terminals communicating with a first P-CSCF share a list, when the first P-CSCF fails, all those terminals may attempt to communicate with the same second P-CSCF based on the list. These attempts to re-register can suddenly double the load on the second P-CSCF. Such rapid load increases can also trigger cascading failures. Moreover, some prior schemes are very restricted in when the list will be consulted to determine a P-CSCF to contact. Restrictions in some of these schemes can increase the effect of a network outage by causing terminals to repeatedly attempt to communicate with an anchoring device that is out of service, consuming bandwidth and resources that are then unavailable for other terminals.

In some examples herein, a terminal can commence a transaction with an anchoring device, e.g., by sending a Session Initiation Protocol (SIP) REGISTER request to the anchoring device. If the transaction is not successful, the terminal can apply stored or predetermined criteria to trigger at least one retry or at least one changeover. As used herein, a "retry" includes commencing a second or subsequent transaction (which may be identical to a preceding transaction) with a particular anchoring device. For example a retry can include retransmitting a message that commences a transaction. As used herein, a "changeover" includes commencing a transaction with an anchoring device with which the terminal has not previously commenced a transaction. Some example systems and techniques described herein select retries and changeovers to reduce latency of registration and other transactions, reducing bandwidth usage during such transactions, or balance load across anchoring devices of a network.

The terms "user equipment," "UE," and "terminal" may be used interchangeably herein to describe any communication or computing device capable of performing techniques described herein with respect to terminals. The terms "session" or "call" as used herein include a communications path for bidirectional exchange of data among two or more terminals. Example sessions include voice and video calls, e.g., by which human beings converse, a data communication session, e.g., between two electronic systems or between an electronic system and a human being, or a Rich Communication Suite (RCS, also known as JOYN) session. As used herein, a "serving network" of a terminal includes a network or portion of a network with which that terminal is registered and via which that terminal can send and receive communications. For example, a serving network can be a particular operator's own network, or can be a network in which the terminal is roaming A serving network can include at least one of an access network or a core network.

Example networks carrying sessions include second-generation (2G) cellular networks such as the Global System for Mobile Communications (GSM) and third-generation (3G)

cellular networks such as the Universal Mobile Telecommunication system (UMTS). Other example networks include fourth-generation (4G) cellular networks, such as Long Term Evolution (LTE) carrying Voice Over LTE (VoLTE) sessions using SIP signaling, the public switched telephone network (PSTN) using Signaling System 7 (SS7) signaling, and data networks, such as Institute of Electrical and Electronics Engineers (IEEE) 802.11 (WIFI) networks carrying voice over Internet Protocol (VoIP) calls or other over-the-top (OTT) sessions encapsulating, e.g., voice or video data in a way transparent to an underlying packet transport. GSM and the PSTN are examples of CS networks; LTE and WIFI are examples of packet-switched (PS) networks. Many networks are "heterogeneous networks," i.e., networks including devices or transport systems with various sets of capabilities. For example, many LTE cellular networks support VoLTE and also interconnect with the PSTN. Some examples are given with respect to SIP signaling; techniques herein can also be used with other signaling protocols.

In some examples, a terminal, e.g., of a cellular or other telecommunications network, is communicatively connectable with a plurality of anchoring devices. The terminal can be configured to perform transactions of a transaction set with respective anchoring devices, and request information of an additional anchoring device in response to failures of all the transactions in the transaction set. In some examples, the terminal can attempt to conduct transactions in a round-robin order with multiple anchoring devices, one at a time. In some examples, the terminal can, in response to a failed transaction with a first anchoring device, retry with the first or with a second anchoring device depending on the nature of the failure. Any of these examples can permit more efficiently managing transaction failures, e.g., to more efficiently re-register terminals in response to network failures.

Illustrative Configurations

FIG. 1 illustrates an example telecommunication system 100. Terminal 102, e.g., user equipment, communicates with access system 104 of the telecommunication system 100. Access system 104 can include one or more access network(s) of respective types (e.g., PS or CS). Different access network(s) can have a common type or different types. The access network(s) can be configured to selectively carry communication session(s) of terminal 102. IMS 106 communicates with access system 104 and provides media-handling services, e.g., to route video or voice data or to maintain continuity of the communication session during handover of the communication session.

In the illustrated example, terminal 102 can communicate with at least one of the following: an eNodeB 108, e.g., a 4G base station or other access point, that provides connectivity to a PS access network 110; a wireless access point (WAP) 112, e.g., a WIFI WAP, that provides connectivity to a LAN-based access network 114; or a CS base station 116 that provides connectivity to a CS access network 118 (e.g., a 2G GSM or 3G UMTS access network). A terminal can be configured to communicate via one type of access network or multiple types, alternatively or simultaneously. For example, many smartphones are configured to communicate, at any given time, with a WIFI access network and, concurrently, either a CS access network (e.g., GSM) or a PS access network (e.g., LTE), but not both.

In the illustrated example, a mobility management entity (MME) 120 can convey traffic between PS access network 110 and IMS 106. A bridge 122 (or other packet relay) can convey traffic between LAN-based access network 114 and IMS 106. A mobile switching center (MSC) server (MSS) 124 can convey traffic between CS access network 118 and IMS 106.

The IMS 106 of the telecommunications network may include a number of nodes, such as a P-CSCF 126, an Interrogating Call Session Control Function (I-CSCF) 128, a home location register (HLR)/HSS 130, an S-CSCF 132, or an application server (AS) 134, e.g., a Telephony Application Server (TAS) or Service Centralization and Continuity Application Server (SCC AS). IMS 106 can also include one or more additional P-CSCFs, e.g., used for load balancing or as hot spares, and shown as P-CSCF 136. The illustrated components of IMS 106 can be in one network or divided between networks. For example, the P-CSCFs 126 and 136 can be in a serving network (e.g., a visited network) and the S-CSCF 132 and AS 134 can be in a home network of the terminal 102.

The telecommunications network may also include a number of devices or nodes not illustrated in FIG. 1. Such devices or nodes may include an access transfer control function (ATCF), an access transfer gateway (ATGW), a visitor location register (VLR), a serving general packet radio service (GPRS) support node (SGSN), a gateway GPRS support node (GGSN), a policy control rules function (PCRF) node, a serving gateway (S-GW), a session border controller (SBC), an ISBC or IBCF, a BGCF, or a media gateway (MGW). IMS 106 may further include a number of devices or nodes not illustrated in FIG. 1, such as a presence server and one or more additional CSCFs. A core network of the telecommunications network may be a GPRS core network or an evolved packet core (EPC) network, or may include elements from both types of core networks.

The telecommunications network may provide a variety of services to terminal 102, such as conducting communication sessions between terminal 102 and another terminal 138 (shown in phantom). Further services may include call control, switching, authentication, billing, synchronous communication routing across a PSTN, etc. In at least one example, IMS 106 functions and devices communicate using specific services provided by the access system 104 or elements thereof, but are not directly tied to those specific services. For example, IMS 106 devices can intercommunicate using an EPC network, a GSM network, a SONET network, or an Ethernet network.

In some examples of session control, a signaling path ("SIG") of a communication session passes from terminal 102 through access system 104, P-CSCF 126, S-CSCF 132, and AS 134, as indicated by the dash-dot connector. After AS 134, the example signaling path passes back through S-CSCF 132 to terminal 138 (shown in phantom), or to a network node (omitted for brevity) configured to convey network traffic to and from terminal 138. In other examples of session control, the signaling path can pass between access system 104 and S-CSCF 132 via P-CSCF 136 instead of via P-CSCF 126, as indicated by the line of chevrons (the chevrons can indicate unidirectional data flow in either direction, or bidirectional data flow, but do not imply a direction requirement). Providing multiple possible signaling paths can increase network robustness and reduce the probability that an individual node, e.g., a P-CSCF 126 or 136, will become overloaded.

In the illustrated example, P-CSCF 126 and AS 134 are anchoring devices, i.e., devices that proxy signaling traffic for the communication session. For example, an anchoring device can operate as a SIP proxy or back-to-back user agent (B2BUA). In another example, the MSS 124 can be an anchoring device and can proxy signaling traffic for the communication session, e.g., GSM or SS7 signaling traffic. The AS 134 (or other anchoring device, and likewise throughout) can provide session-control services to terminal 102. Other example anchoring devices can include an I-CSCF, a SIP Routing Engine (SRE), a Border Gateway Control Function (BGCF), or an Internet Protocol (IP) Packet eXchange (IPX) peer device. As used herein, nodes "behind" an anchoring device are nodes communicatively connectable with terminal 102 via that anchoring device.

Before initializing a communication session, the terminal 102 can register with IMS 106. Registration is an example of an action conducted via a network. In some examples of registration, the terminal 102 establishes a connection with access system 104, e.g., via at least one of access networks 110, 114, or 118. Terminal 102 then determines network address(es) of at least one P-CSCF 126, 136 or other anchoring device. The address(es) can be stored in a non-volatile memory of terminal 102. Additionally or alternatively, a component of access system 104, e.g., MME 120, can provide terminal 102 with address(es), e.g., in an Activate Bearer Context request (e.g., 3GPP TS 24.229 v13.5.1., § L.2.2.1). Additionally or alternatively, a component of access system 104 such as a Dynamic Host Configuration Protocol (DHCP) server (RFC 2131 or RFC 3319) or other autoconfiguration server can provide terminal 102 with the address(es). Terminal 102 can then select one of the address(es) as an initial candidate.

Terminal 102 can then commence a transaction with the anchoring device associated with the candidate address, e.g., P-CSCF 126. Via P-CSCF 126, terminal 102 can present credentials to S-CSCF 132 and establish a SIP registration that will permit terminal 102 to originate and receive communication sessions. For example, terminal 102 can send a SIP REGISTER request to the IMS 106 via an access network, e.g., via the eNodeB 108 and MME 120 of the PS access network 110. The P-CSCF 126 of the IMS 106 can receive the SIP REGISTER request. P-CSCF 126 can forward the REGISTER request directly to S-CSCF 132, or can forward the request to I-CSCF 128, which can locate an appropriate S-CSCF 132, e.g., using stored database information or information from HLR/HSS 130. I-CSCF 128 can then forward the REGISTER request to the located S-CSCF 132. In some examples, the P-CSCF 126 is located in a visited network of terminal 102 and the I-CSCF 128 and S-CSCF 132 are located in a home network of terminal 102. The S-CSCF 132 or other components (omitted for brevity) of the IMS 106 can store information about the terminal 102 in the HLR/HSS 130 and then send a SIP 200 OK response to the terminal 102 to complete the IMS registration of the communication session.

In some examples, communication via P-CSCF 126 may not be successful. For example, P-CSCF 126 may be failing (e.g., malfunctioning or unreachable by terminal 102), or S-CSCF 132 or another node behind P-CSCF 126 may be failing (e.g., down or unreachable by P-CSCF 126). If registration attempts via the P-CSCF 126 (or other anchoring device) at the selected address are unsuccessful, terminal 102 can attempt to communicate via another of the address(es) in order to complete the action. For example, if P-CSCF 126 fails, terminal 102 can attempt to register via P-CSCF 136. In some examples, P-CSCF can be communicatively connectable with I-CSCF 128. In some examples, if terminal 102 is unable to register via any of the anchoring devices on the list of address(es), terminal 102 can request a new list of address(es), e.g., via DHCP or an access-network-specific procedure. FIGS. 2-8 show various example configurations of registration attempts, and requests for additional address(es), by terminal 102.

In some examples, a SIP REGISTER request from terminal 102 to a P-CSCF 126 or 136 may fail for various reasons, e.g., at the P-CSCF 126, 136 or at another component of the IMS 106. Runtime failure of a P-CSCF 126 can increase the load on other P-CSCFs 136 as the terminals formerly served by the failed P-CSCF 126 attempt to register with P-CSCF 136 instead. Some examples permit the terminal 102 to more intelligently retry registrations based on the specific error returned. This can reduce network load and improve user experience. Some examples of core nodes, such as DHCP servers, hand out P-CSCF addresses to terminals in a round-robin manner or another way that spreads load across the population of P-CSCFs. For example, a DHCP server can assign P-CSCF addresses randomly, e.g., 2-3 addresses selected randomly from a pool of P-CSCFs each time terminal 102 (or a component of access system 104 on behalf of terminal 102) requests addresses.

Techniques described herein with respect to registration can additionally or alternatively be used for at least one of setup of communication sessions, teardown of sessions, or transmissions during an established phase of a communication session, in some examples. Examples of messages during an established phase can include messages, e.g., to transfer a file, to switch between audio and video calling, or to change access legs, e.g., in the event of a handover between access networks or base stations.

Figure 2:
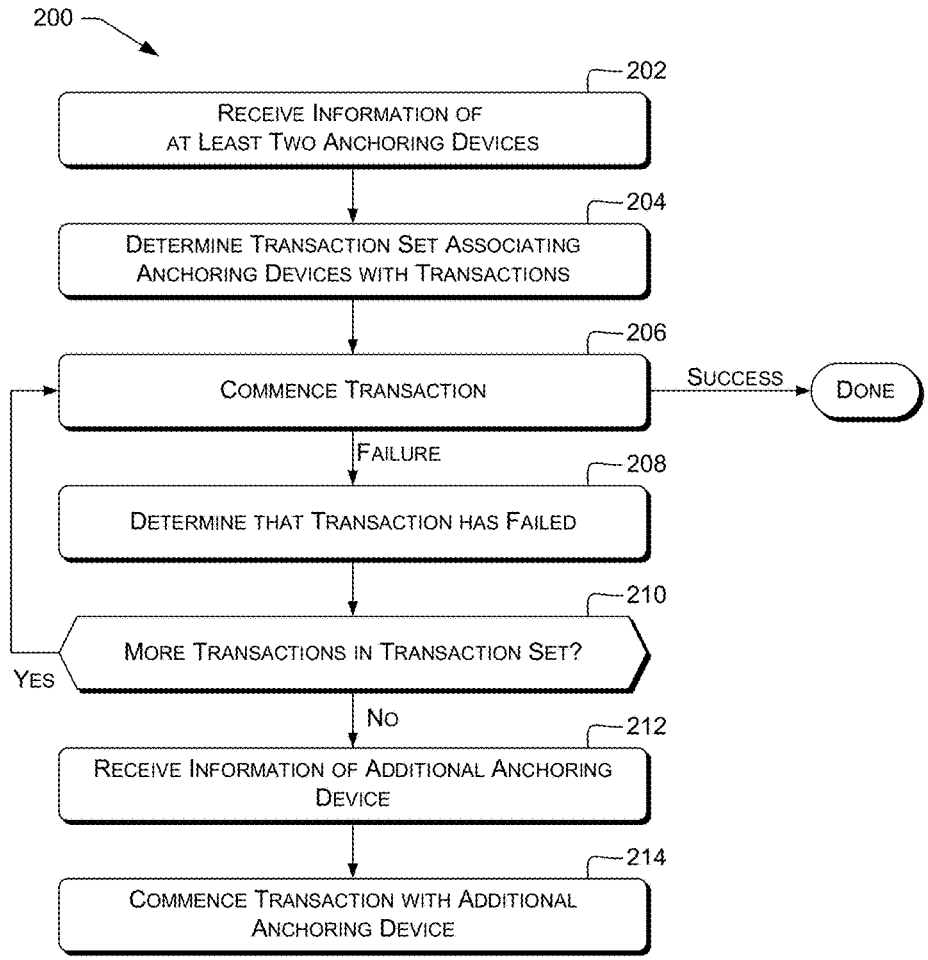
FIG. 2 illustrates an example process for registering with a network, including requesting information of an anchoring device, according to some implementations.

FIG. 2 illustrates an example process 200 for registering with a network, e.g., IMS 106, or performing another action via a network. Process 200 can be performed, e.g., by a terminal of a telecommunication system, e.g., terminal 102. Operations shown in FIG. 2 and in FIGS. 3-8, discussed below, can be performed in any order except when otherwise specified, or when data from an earlier step is used in a later step. For clarity of explanation, reference is herein made to various components shown in FIGS. 1 and 9 that can carry out or participate in the steps of example method(s) herein. It should be noted, however, that other components can be used; that is, example method(s) shown in FIGS. 2-8 are not limited to being carried out by the identified components, and are not limited to including the identified operations or messages.

Techniques described with reference to FIGS. 2-8 can be performed by a terminal 102 or 138, or by other network devices. For example, a P-CSCF of a visited network can use example techniques herein when attempting to communicate with an I-CSCF of a home network. Moreover, although the context of registration is discussed for clarity of explanation, this is not limiting. Techniques in FIGS. 2-8 can be used for other actions, e.g., for setting up and tearing down communication sessions.

In some examples, at block 202, terminal 102 can receive information of at least two anchoring devices, e.g., P-CSCFs 126 and 136. For example, as discussed above, terminal 102 can retrieve the information from memory, e.g., from memory of an IMS Subscriber Identity Module (SIM) or from an IMS Management Object (IMO). Additionally or alternatively, terminal 102 can receive the information from component(s) of access system 104. Additionally or alternatively, terminal 102 can request or receive the information via a DHCP or other host-configuration packet exchange. The information can include, e.g., hostname(s) or network address(es) of the anchoring devices. In some examples in which the information includes at least one hostname, at least one of the access system 104 or the IMS 106 provides name-lookup services usable by terminal 102 even before registration to determine network address(es) associated with specific hostnames In some examples, at block 204, terminal 102 can determine a transaction set. The transaction set can include data, e.g., stored in a computer-readable memory, of transactions that are candidates for being commenced. For example, data of a transaction can include a network address of an anchoring device, and an indication that a SIP REGISTER request should be sent to that anchoring device. In some examples, the transactions in the transaction set can be stored in order, or can be otherwise associated with an order in which the transactions will be commenced, e.g., a traversal order. Individual ones, e.g., each, of the anchoring devices can be associated with a respective number of transactions of the transaction set.

For example, the transaction set can include two transactions to P-CSCF 126 followed by two transactions to P-CSCF 136. Executing this example transaction set in order, as discussed below, will cause terminal 102 to attempt, up to two times, to register via P-CSCF 126. If neither attempt is successful, terminal 102 will attempt, up to two times, to register via P-CSCF 136.

The transaction set determined at block 204 can include any number of transactions (zero or more) for any individual one of the at least two anchoring devices. For example, the transaction set can include at least one transaction associated with a first anchoring device of the at least two anchoring devices, and at least one transaction associated with a second anchoring device of the at least two anchoring devices. Transactions to specific anchoring devices can be listed in any order in the transaction set; examples are discussed below.

In some examples, the transaction set can be associated with a single "action." An action includes transactions commenced or queued to be commenced, if necessary, in order to accomplish a single task. For example, registering with IMS 106 is a single action that may be accomplished with a single transaction, or that may require multiple transactions with one or more P-CSCFs 126, 136. Retries and changeovers can be counted per action. For example, a terminal can change over from a first anchoring device to a second anchoring device while processing a first action, then later change over from the second anchoring device to the first anchoring device while processing a second, different action.

In some examples, at block 206, terminal 102 can commence the transaction with the respective anchoring device via the network, e.g., via access system 104 or IMS 106. For example, at block 206, terminal 102 can retrieve the information of a transaction from the transaction set. The retrieved transaction can be the first transaction or the next transaction not yet commenced, e.g., as discussed herein with reference to decision block 210. The transaction can indicate or be associated with an anchoring device, e.g., by containing a network address of the anchoring device. For brevity, that anchoring device is referred to herein as the "current anchoring device." Terminal 102 can then, in accordance with instructions in or associated with the transaction, transmit or receive message(s), e.g., data packet(s), with the current anchoring device via the network, start timers, or take other protocol actions. For example, terminal 102 can transmit a SIP REGISTER request to the current anchoring device. Additionally or alternatively, terminal 102 can set a timer, e.g., by recording an exact or approximate timestamp of transmission of the SIP REGISTER request. If the transaction succeeds, processing of the registration can terminate, and normal network operations can be carried out via the anchoring network device.

In some examples, at block 208, terminal 102 can determine that the transaction has failed. For example, block 208 can include receiving an error response from the current anchoring device, e.g., a SIP 503 Service Unavailable error. Additionally or alternatively, block 208 can include determining that a timer has elapsed and that a response (or an expected response) was not received before the timer elapsed. Additional examples of determining transaction failures are given below, e.g., with reference to blocks 404 or 502-508.

In some examples, at decision block 210, terminal 102 can determine whether there is another transaction in the transaction set. If so, decision block 210 can be followed by block 206, with the next transaction in the transaction set being the transaction to be commenced at block 206. If all transactions in the transaction set have been commenced or another termination criterion has been satisfied (e.g., a predetermined number of failures), decision block 210 can be followed by block 212. In this way, in some examples, blocks 206 and 208 can be performed, e.g., for at least one transaction of the transaction set, for more than one transaction of the transaction set, or for each transaction of the transaction set. In some examples, block 212 can be performed, e.g., when one transaction has failed, when a predetermined number of transactions have failed, or when each transaction of the transaction set has failed.

In some examples in which two transactions are commenced consecutively for the same anchoring device, the second transaction is a retry. In some examples in which a transaction for a first anchoring device is followed by a second transaction for a second, different anchoring device, the second anchoring device is a changeover. The transaction set can include any number of retries or changeovers, in any order.

In some examples, at block 212, terminal 102 can receive, via a network, information of an additional anchoring device. As noted above, block 212 can be performed after at least one of, or all of, blocks 206, 208, or 210. For example, when the transaction set has been exhausted and no successful registration has been performed, terminal 102 can request an additional P-CSCF address, e.g., via DHCP or other techniques discussed above with reference to block 202. In some examples, block 212 can include receiving information of two or more additional anchoring devices and selecting a first anchoring device as a current anchoring device.

In some examples, at block 214, terminal 102 can commence a transaction with the additional anchoring device (or the current anchoring device of the additional anchoring device) via the network. Examples are discussed above, e.g., with reference to block 206. In some prior schemes, the list of anchoring devices is fixed, e.g., by being stored in terminal 102 or by a requirement that additional anchoring-device addresses can only be acquired when terminal 102 powers up or when a network interface of terminal 102 first comes online By contrast, techniques herein, e.g., using blocks 212 and 214, can acquire additional anchoring-device addresses without requiring power-cycling of terminal 102 or cycling of a network interface thereof to an inactive state and then to an active state. This can permit more rapidly recovering from failures of an anchoring device or more rapidly registering in a situation in which at least one anchoring device is unavailable.

Figure 3:
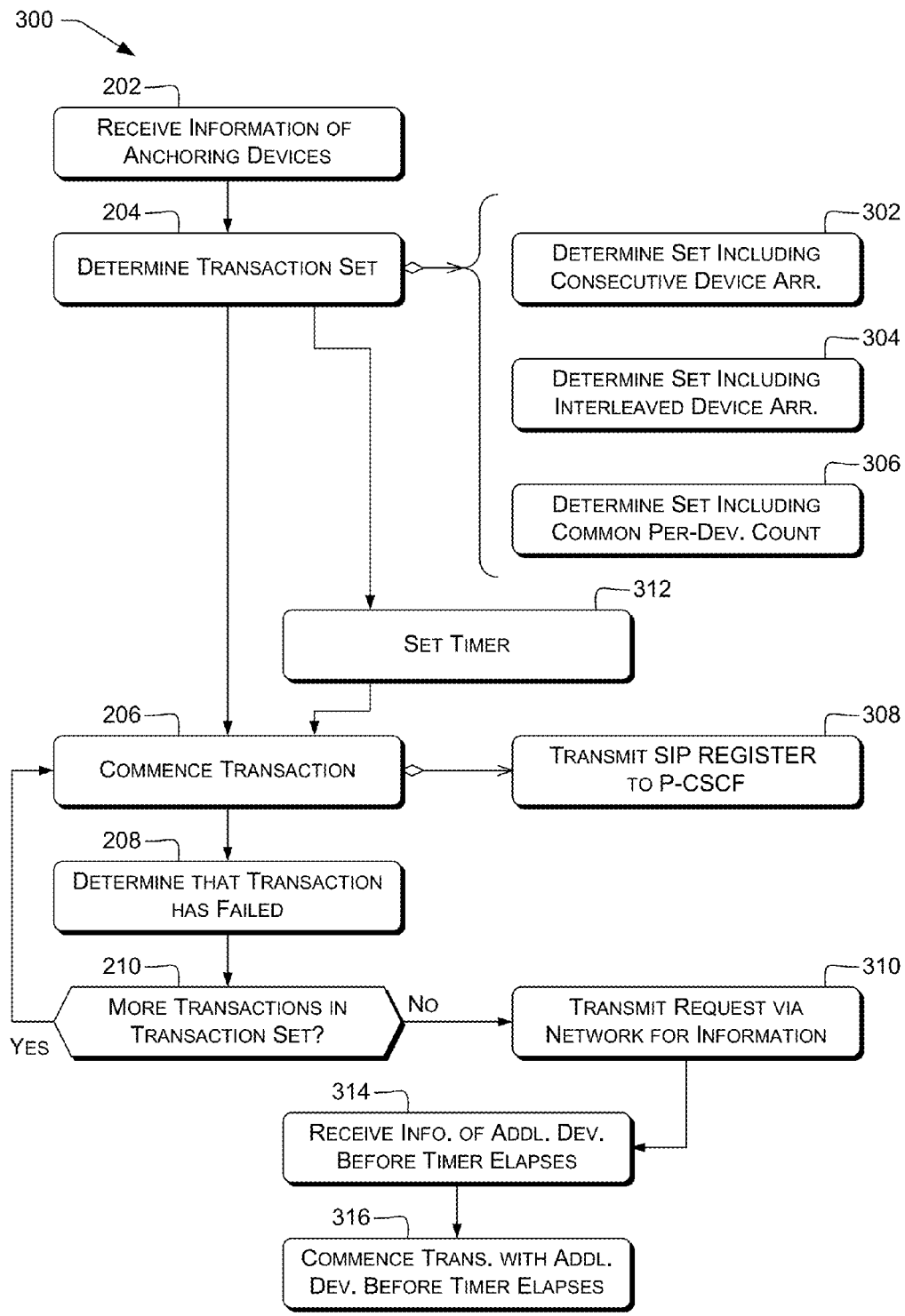
FIG. 3 illustrates an example process for registering with a network according to some implementations.

FIG. 3 illustrates an example process 300 for registering with a network, e.g., IMS 106. Process 300 can be performed, e.g., by a terminal of a telecommunication system, e.g., terminal 102. In some examples, block 204 can include at least one of blocks 302, 304, or 306. In some examples, block 206 can include block 308. In some examples, block 210 can be followed by block 310, which can be followed in turn by block 212 or block 314. In some examples, block 206 can be preceded by block 312. In some examples using block 312, block 310 can be followed by at least one of blocks 314, 316, or 214.

In some examples, at block 302, terminal 102 can determine the transaction set including a consecutive anchoring-device arrangement. For example, the transaction set can include the respective number of transactions with a first anchoring device of the at least two anchoring devices, followed by the respective number of transactions with a second, different anchoring device of the at least two anchoring devices. In an example using two anchoring devices denoted "X" and "Y," the transaction set can list a number of X-device transactions followed by a number of Y-device transactions.

In some examples, at block 304, terminal 102 can determine the transaction set including an interleaved anchoring-device arrangement. For example, the transaction set can include at least one transaction with a first anchoring device arranged between two transactions with a second, different anchoring device of the at least two anchoring devices. For example, the transaction set can include, in order, transactions to devices X, Y, X; or devices Y, X, Y; or devices X, Y, X, Y.

In some examples, at block 306, terminal 102 can determine the transaction set including a predetermined number of the transactions with each of the at least two anchoring devices. For example, the transaction set can include the same number of X-device transactions as Y-device transactions (e.g., X, X, Y, Y; or X, Y, X, Y). In some examples, the transaction set can include two transactions per anchoring device. In some examples, blocks 302 and 306 can be used together. In some examples, blocks 304 and 306 can be used together. In other examples, the number of transactions with a first anchoring device can be different from the number of transactions with a second anchoring device.

In some examples, at block 308, terminal 102 can commence individual transactions, or each transaction, of the transaction set by transmitting a SIP REGISTER request to the respective anchoring device. In some examples, including some examples using block 308, each anchoring device comprises a P-CSCF, e.g., P-CSCF 126 or 136.

In some examples, at block 310, terminal 102 can, in response to the determining that a last transaction of the transaction set has failed, transmitting, via the network, a request for the information of the additional anchoring device. Block 310 can be followed by block 212 or block 314. In some examples, blocks 312 and 314 are used together.

In some examples, at block 312, terminal 102 can, before commencing any transaction of the transaction set, setting a timer. For example, terminal 102 can record a start time, or set a countdown timer, to measure a maximum permissible delay before receiving a response from the current anchoring device. An example of such a timer is SIP Timer F, defined in RFC 3261 § 17.1.4.

In some examples, at block 314, terminal 102 can receive the information of the additional anchoring device before the timer set in block 312 elapses. Examples are discussed above, e.g., with reference to block 212. Block 314 can be followed by block 214 or block 316.

In some examples, at block 316, terminal 102 can commence the transaction with the additional anchoring device before the timer set in block 312 elapses. Examples are discussed above, e.g., with reference to block 214.

Some prior schemes, while attempting to conduct a transaction with a first anchoring device that is not responsive to communications from a terminal, wait until Timer F expires before attempting to communicate with a second, different anchoring device. Since Timer F has a default of 32 s (RFC 3261 Appendix A, Table 4), this can result in long delays in registering if the first anchoring device fails. By contrast, in some examples, e.g., using block 312 and at least one of block 314 or block 316, terminal 102 can move away from a non-responsive anchoring device (e.g., P-CSCF) before Timer F or another timer expires. This can provide faster registration in the presence of a non-responsive anchoring device, and can permit resuming service more rapidly when an anchoring device goes offline.

Figure 4:
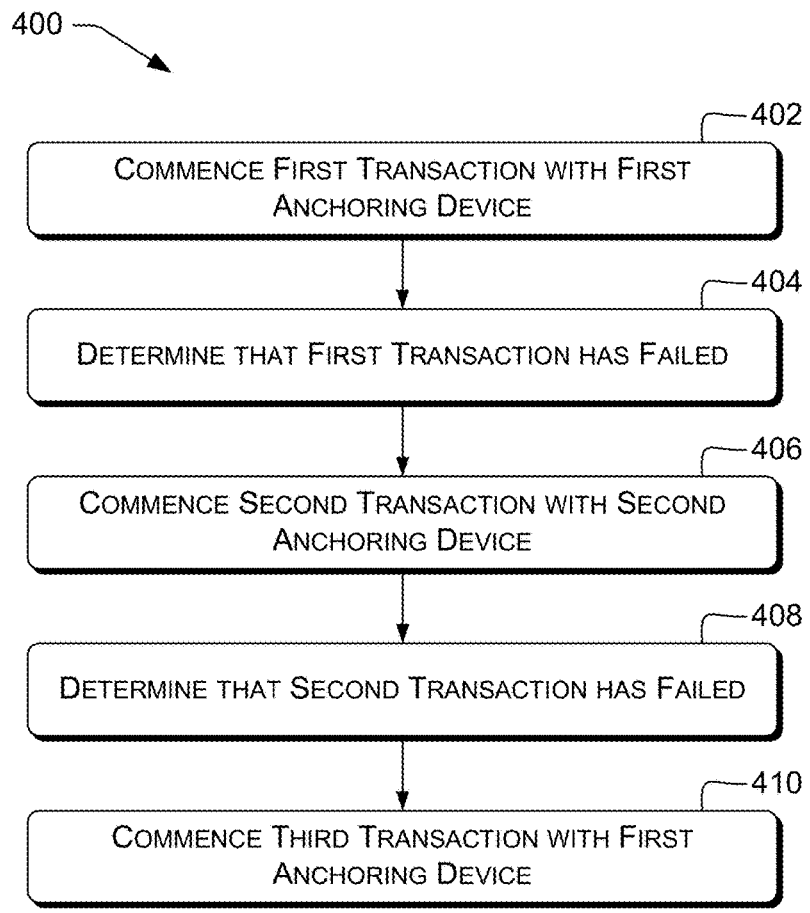
FIG. 4 illustrates an example process for registering with a network, including communicating with two anchoring devices, according to some implementations.

FIG. 4 illustrates an example process 400 for registering with a network, e.g., IMS 106. Process 400 can be performed by a terminal (e.g., terminal 102) of a network (e.g., telecommunication system 100). In some nonlimiting examples of process 400, a terminal 102 can try multiple anchoring devices in round-robin order, e.g., as discussed herein with reference to some examples of block 304. In some examples, at any point during process 400, if a transaction succeeds, processing can conclude, e.g., as discussed herein with reference to block 206.

In some examples, at block 402, terminal 102 can commence a first transaction with a first anchoring device via the network. For example, terminal 102 can transmit a SIP REGISTER request towards the first anchoring device, e.g., P-CSCF 126. Examples are discussed above, e.g., with reference to block 206.

In some examples, at block 404, terminal 102 can determine that the first transaction has failed. Examples are discussed above, e.g., with reference to block 208.

In some examples, at block 406, in response to the failure of the first transaction, terminal 102 can commence a second transaction with a second, different anchoring device via the network. Examples are discussed above, e.g., with reference to block 206. The second transaction can be commenced with the same type of message as the first transaction, or with a different type of message, depending on the specifics of the anchoring devices involved.

In some examples, at block 408, terminal 102 can determine that the second transaction has failed. Examples are discussed above, e.g., with reference to block 208.

In some examples, at block 410, in response to the failure of the second transaction, terminal 102 can commence a third transaction with the first anchoring device via the network. Block 410 can represent block 402 or be followed by block 404. In this way, two anchoring devices can be tested in round-robin order. Process 400 can be used with more than two anchoring devices.

In some examples, commencing each of the first transaction, the second transaction, and the third transaction (blocks 402, 406, 410) comprises transmitting a respective SIP REGISTER request to the respective anchoring device. In some of these examples and other examples, individual ones, or each, of the first anchoring device and the second anchoring device comprises a respective P-CSCF.

Figure 5:
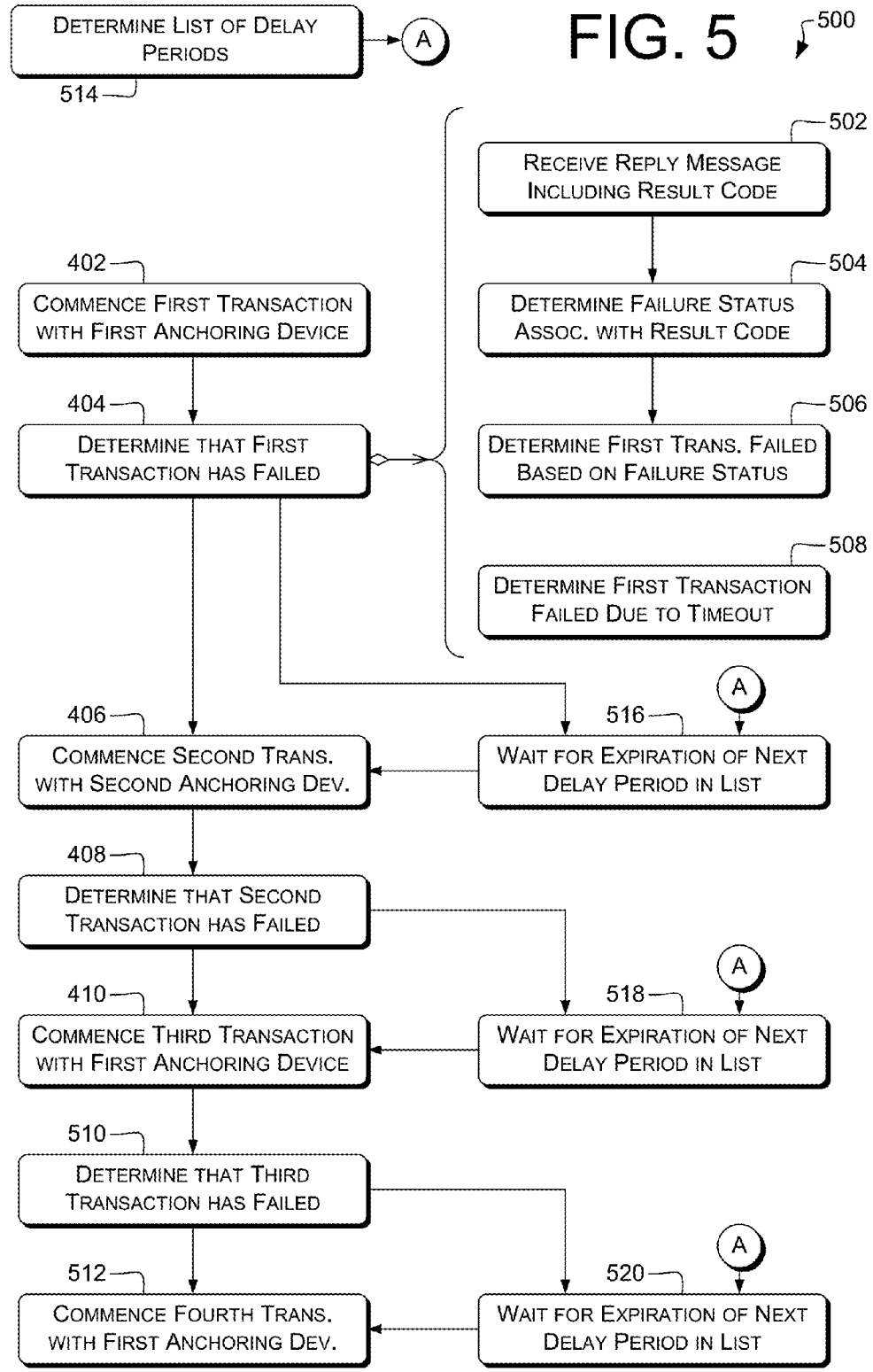
FIG. 5 illustrates an example process for registering with a network, including communicating multiple times with two anchoring devices, according to some implementations.

FIG. 5 illustrates an example process 500 for registering with a network, e.g., IMS 106. Process 500 can be performed by a terminal (e.g., terminal 102) of a network (e.g., telecommunication system 100). Some examples can include at least one of the following: block 404 can include blocks 502-506; block 404 can include block 508; block 404 can be followed by block 516; block 516 can be followed by block 406; block 408 can be followed by block 518; block 518 can be followed by block 410; block 410 can be followed by block 510; block 510 can be followed by block 520; block 520 can be followed by block 512; or at least one of blocks 516-520 can be preceded by block 514 (as indicated by connector "A").

In some examples, block 404 of determining that the first transaction has failed can include at least one of (1) blocks 502-506, or (2) block 508. At least one of blocks 502-508 can additionally or alternatively be used to determine that any transaction discussed herein has failed, in some examples. Blocks 502-506 process reply messages from a current anchoring device, and block 508 processes a timeout while waiting for a response, in some examples.

In some examples, at block 502, terminal 102 can receive a reply message associated with the first anchoring device. The reply message can include a result code. For example, the reply message can include a SIP response, and the result code can include the SIP response code of the reply message. The reply message can be received from the anchoring device or from another network component, e.g., a router or a component of access system 104 between the terminal 102 and the anchoring device. For example, the reply message can include an Internet Control Message Protocol (ICMP, RFC 792) Host Unreachable message sent by, e.g., an S-GW of PS access network 110.

In some examples, at block 504, terminal 102 can determine a failure status associated with the result code using a predetermined result mapping. For example, the predetermined result mapping can include a lookup table (LUT) or other stored information associating the result code with a failure status. Example failure-status values or categories of values are listed in Table 1. For example, "Proceeding" can represent a specific status value such as the text string "PROCEEDING", or can represent a category of status values, such as SIP 1xx (codes 100-199). As used herein, a SIP response code ending in "xx", e.g., a SIP 1xx Provisional response, signifies any response of, e.g., class 1 of SIP responses (RFC 3261, §7.2).

TABLE 1

| Value/<br>Category | Explanation |
|---|---|
| Proceeding | The transaction was commenced successfully. E.g., a SIP 1xx response. |
| Complete | The transaction was commenced successfully, and completed successfully. E.g., a SIP 2xx response. |
| Transient failure | The transaction was not commenced successfully, or was not completed successfully. However, the current anchoring device may be able to commence or complete a newly-commenced, retry transaction. |
| Retry | The transaction was not commenced successfully or was not completed successfully. Moreover, the current anchoring device recommends a retry. |
| Hard failure | The transaction was not commenced successfully, or was not completed successfully. Moreover, the current anchoring device will likely not be able to commence or complete the transaction in response to a retry. Note that a hard-failure status does not require that the anchoring device be permanently out of service. |
| Unreachable | At least one of the message(s) commencing the transaction did not reach the anchoring device. E.g., an ICMP message. |

In some examples, the result mapping can be based on other values of the reply message instead of or in addition to the result code. For example, the result mapping can indicate that a SIP error response (3xx, 4xx, 5xx, or 6xx) containing a SIP Retry-After header is associated with a transient-failure status, and that a SIP error response not containing a Retry-After header is associated with a hard-failure status. In some examples, the result mapping can be based on information of a network via which communications are being conducted, e.g., an access network of access system 104 or IMS 106. Such information can be carried, e.g., in a "P-Access-Network-Info" SIP header. In some examples, the mapping can include a default failure status for result codes or other conditions not specifically listed. In some examples, a single code can be used for both "transient failure" and "retry" shown in Table 1.

In some examples, block 504 can include determining that a non-challenge response to the transaction was received. For example, a SIP 401 Unauthorized response or other challenge can indicate that the anchoring device is alive and ready to respond to authentication information. Therefore, the result mapping can indicate that reply messages including challenges are not errors and do not indicate failure. In some examples, processing of challenges can be handled at block 402.

In some examples, block 504 can include determining that the result code is a predetermined result code indicating a failure, referred to herein as a "custom failure-indication code." For example, a custom failure-indication code can include a vendor-specific code, an assignment of a private-use code, or a code not defined in the relevant standards as indicating a failure. For example, a SIP 999 response can be a response including the custom failure-indication code 999. In some examples, any SIP 7xx, 8xx, or 9xx response can include a custom failure-indication code. In some examples, the custom failure-indication code can be included in a header of a message, e.g., in an "X-" series experimental-use or vendor-specific header, or in the body of a message.

In some examples, at block 506, terminal 102 can determine that the first transaction has failed in response to the failure status indicating a transient-failure condition. Since the failure is transient, determining that the first transaction has failed permits retrying at a later time, e.g., at block 410, by which time transient failures may have been resolved. Other examples of failure-status processing as discussed herein with reference to blocks 606 and 608, FIG. 6, blocks 704 and 708, FIG. 7, or blocks 806 and 808, FIG. 8.

In some examples, at block 508, terminal 102 can determine that the first transaction has failed due to a timeout. Block 508 can be used in parallel with, before, after, or instead of blocks 502-506. For example, a timeout can be detected at block 508 while awaiting the reply message described herein with reference to block 502. In some examples, a timeout can be due to transient failures of individual components between terminal 102 and the current anchoring device, or to transient failures of the current anchoring device. Therefore, in some examples, determining that the first transaction has failed due to a timeout permits retrying at a later time, e.g., at block 410, by which time transient failures may have been resolved.

In some examples, at block 510, after commencing the third transaction (block 410), terminal 102 can determine that the third transaction has failed. Examples are discussed above, e.g., with reference to block 208.

In some examples, at block 512, terminal 102 can, in response to the failure of the third transaction, commence a fourth transaction with the second anchoring device via the network. This can continue the round-robin order. Examples are discussed above, e.g., with reference to block 406.

In some examples, exponential backoff or other backoff techniques are used to reduce the likelihood over overloading a single anchoring device. If a transaction fails, terminal 102 can wait for an amount of time determined, e.g., by a LUT or a formula, before attempting to commence another transaction. In some examples of backoff, the time can be randomly (or pseudo-randomly, and likewise throughout the document) determined within a range. In some examples of exponential backoff, the amount of time, or the range, increases as a predetermined base raised to the power of the number of the retry (e.g., 0 for the first transaction, 1 for the first retry, 2 for the second retry, . . . ). In some examples, each anchoring device has its own retry count. In some examples, a single retry count is used across anchoring devices. Some examples of the latter are discussed below with reference to blocks 514-520. Backoffs as described herein can additionally or alternatively be used with other techniques described herein for commencing transactions after a transaction has failed. For example, a backoff delay can be applied before at least one of blocks 206, 214, or 316. In some examples, exponential backoff can be performed as described in RFC 5626, § 4.5.

In some examples, at block 514, terminal 102 can determine a list of delay periods based at least in part on a common scale, a common base, and respective, different exponents. The respective exponent for each delay period of the list, other than a first delay period, can be higher than the respective exponent for a respective preceding delay period of the list. The quantities can be denoted scale s, base b, exponents $e_0, e_1, \ldots$, and delay periods (or ranges) $p_0, p_1, \ldots, p_n = s \times b^{e_n}$ for retry number n (starting from 0). Exponent $e_0$ can be associated with the first delay period $p_0$. In some examples, the range of delays for delay period n is $[p_n/2, p_n]$. In some examples, $e_0 < e_1 < \ldots < e_n$. In some examples, s=30 sec, b=2, and $e_n$=n. Delays are therefore up to 60 s ($p_0$), up to 120 s ($p_1$), up to 240 s ($p_2$), . . . . Beginning with n=0 at the first transaction is not limiting; other indexing schemes or formulas can be used.

In some examples, at blocks 516, 518, or 520, before commencing the second transaction (block 406), the third transaction (block 410), or the fourth transaction (block 512), respectively, terminal 102 can wait for expiration of a next delay period in order through the list of delay periods. In some examples, e.g., examples using blocks 516, 518, or 520, a single retry count (n) is used for each of the anchoring devices in the round-robin arrangement. For example, block 516 can include waiting up to $p_0$ seconds, block 518 can include waiting up to $p_1$ seconds, or block 520 can include waiting up to $p_2$ seconds.

Figure 6:
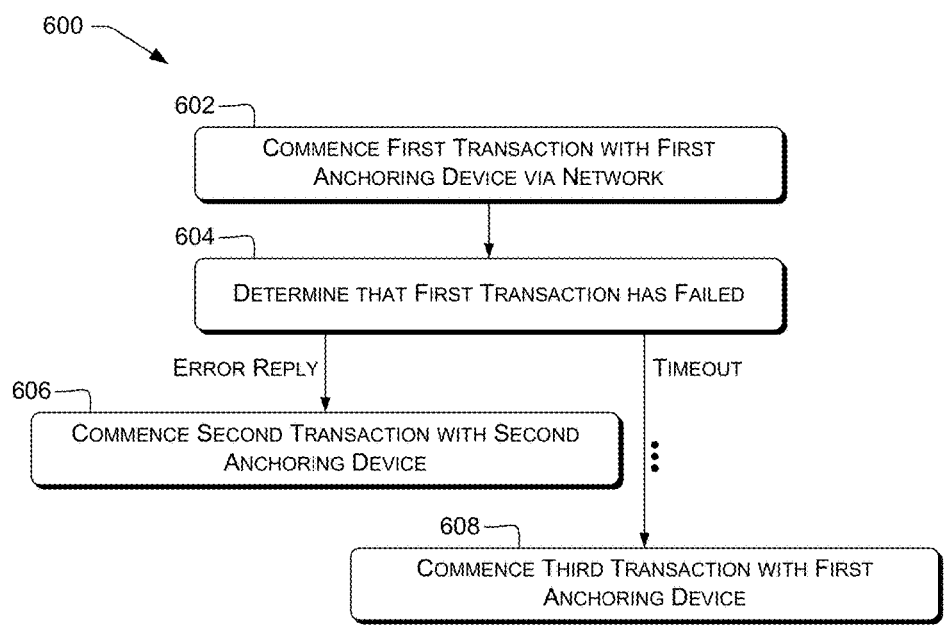
FIG. 6 illustrates an example process for registering with a network, including selectively performing retry or changeover, according to some implementations.

FIG. 6 illustrates an example process 600 for registering with a network, e.g., IMS 106. Process 600 can be performed by a terminal (e.g., terminal 102) of a network (e.g., telecommunication system 100).

In some examples, at block 602, terminal 102 can commence a first transaction with a first anchoring device via the network. Examples are discussed above, e.g., with reference to block 206.

In some examples, at block 604, terminal 102 can determine that the first transaction has failed. Examples are discussed above, e.g., with reference to block 208. For example, block 604 can include determining that the first transaction has failed, e.g., due to receipt of an error reply or due to a timeout. Examples of an error reply are discussed herein with reference to blocks 502-506. Examples of a timeout are discussed herein with reference to block 508.

In some examples, at block 606, in response to the first transaction failing by receipt of an error reply, terminal 102 can commence a second transaction with a second, different anchoring device via the network. Examples are discussed above, e.g., with reference to block 406. In some examples, an error reply can indicate a hard failure of an anchoring device, or a failure of another device behind the anchoring device. For example, a SIP 503 Service Unavailable response may indicate failure of a device behind the anchoring device. In some examples, the anchoring device may be configured as a full proxy that maps error codes from nodes behind the anchoring device (e.g., an I-CSCF or S-CSCF) to signaling errors, e.g., SIP errors, passed to terminal 102.

In some examples, at block 608, in response to the first transaction failing due to a timeout, terminal 102 can commence a third transaction with the first anchoring device via the network. Examples are discussed above, e.g., with reference to block 206. For example, as noted above with reference to block 508, some transient failures are caused by timeouts. Retrying can permit successfully commencing or completing transactions with the first anchoring device. This can reduce network latency, e.g., in situations in which the first anchoring device is closer via the network to terminal 102 than is the second anchoring device. As indicated by the ellipsis in FIG. 6, terminal 102 can await expiration of a predetermined or randomly-selected time period between block 604 and block 608, e.g., a backoff time as discussed herein with reference to block 514. Terminal 102 can additionally or alternatively await expiration of a backoff time before block 606.

In some examples, commencing each of the first transaction, the second transaction, and the third transaction comprises transmitting a respective SIP REGISTER request to the respective anchoring device. In some examples, each of the first anchoring device and the second anchoring device comprises a respective P-CSCF. Examples are discussed above, e.g., with reference to FIG. 1.

In some examples, the conditions for blocks 606 and 608 can be reversed. In some of these examples, the second transaction can be commenced with the second anchoring device in the event of a timeout, e.g., expiration of Timer F or another timer. The third transaction can be commenced with the first anchoring device in the event of an error reply. In some examples, a timeout can indicate a hard failure, so changing over upon timeout can reduce the time spent waiting for an anchoring device that will not respond.

Figure 7:
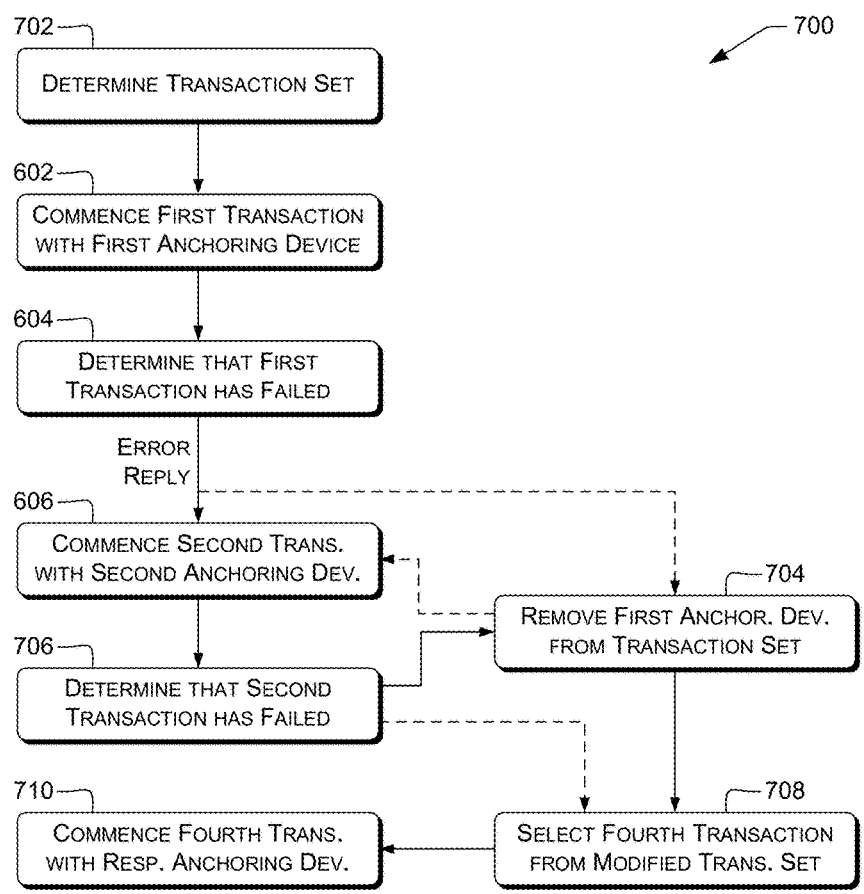
FIG. 7 illustrates an example process for registering with a network, including modifying a transaction set, according to some implementations.

FIG. 7 illustrates an example process 700 for registering with a network, e.g., IMS 106. Process 700 can be performed by a terminal (e.g., terminal 102) of a network (e.g., telecommunication system 100). In FIG. 7, dashed arrows show an alternative flow. In some examples indicated by the dashed arrows, operations of the following blocks can be performed in order: 604, 704, 606, 706, and 708. In some examples indicated by the solid arrows, operations of the following blocks can be performed in order: 604, 606, 706, 704, and 708. In some examples, block 704 can be performed any time between block 604 and block 708.

In some examples, at block 702, terminal 102 can determine a transaction set. For example, block 702 can be performed prior to commencing the first transaction of a particular action. The transaction set can include a respective number of transactions with each anchoring device of a plurality of anchoring devices. The transaction set can include the first transaction (block 602) and at least one transaction with the second anchoring device (e.g., block 606). In some examples, block 702 can be followed by blocks 602 and 604. For example, at block 602, the first transaction in the transaction set can be commenced. Block 604 can be followed by block 606 (solid) or block 704 (dashed).

In some examples, at block 704, terminal 102 can, in response to the error reply at block 604, remove any transactions with the first anchoring device from the transaction set to provide a modified transaction set. In some examples, an error reply can indicate a hard failure of the first anchoring device or of a network node behind the first anchoring device. Therefore, removing transactions with the first anchoring device from the transaction set can reduce the probability of delay due to further unsuccessful transactions with the first anchoring device. Block 704 can be used with consecutive-retry transaction sets or round-robin transaction sets, as described herein. In some examples, block 704 can be followed by block 606 (dashed) or block 708 (solid). Block 606 can be followed by block 706.

In some examples, at block 706, terminal 102 can determine that the second transaction has failed. Examples are discussed above, e.g., with reference to block 208. Block 706 can be followed by block 704 (solid) or block 708 (dashed), as discussed above.

In some examples, at block 708, terminal 102 can select a fourth transaction from the modified transaction set, e.g., the next transaction in order. Examples are discussed above, e.g., with reference to decision block 210. Block 708 can be performed, e.g., subsequent to the determination at block 706.

In some examples, at block 710, terminal 102 can commence the fourth transaction with the respective anchoring device via the network. Examples are discussed above, e.g., with reference to block 206. Some examples using blocks 704, 708, and 710 permit discontinuing attempts to reach anchoring devices that may be experiencing hard failures before the expiration of a timer such as Timer F, which can reduce the latency of call setup.

Figure 8:
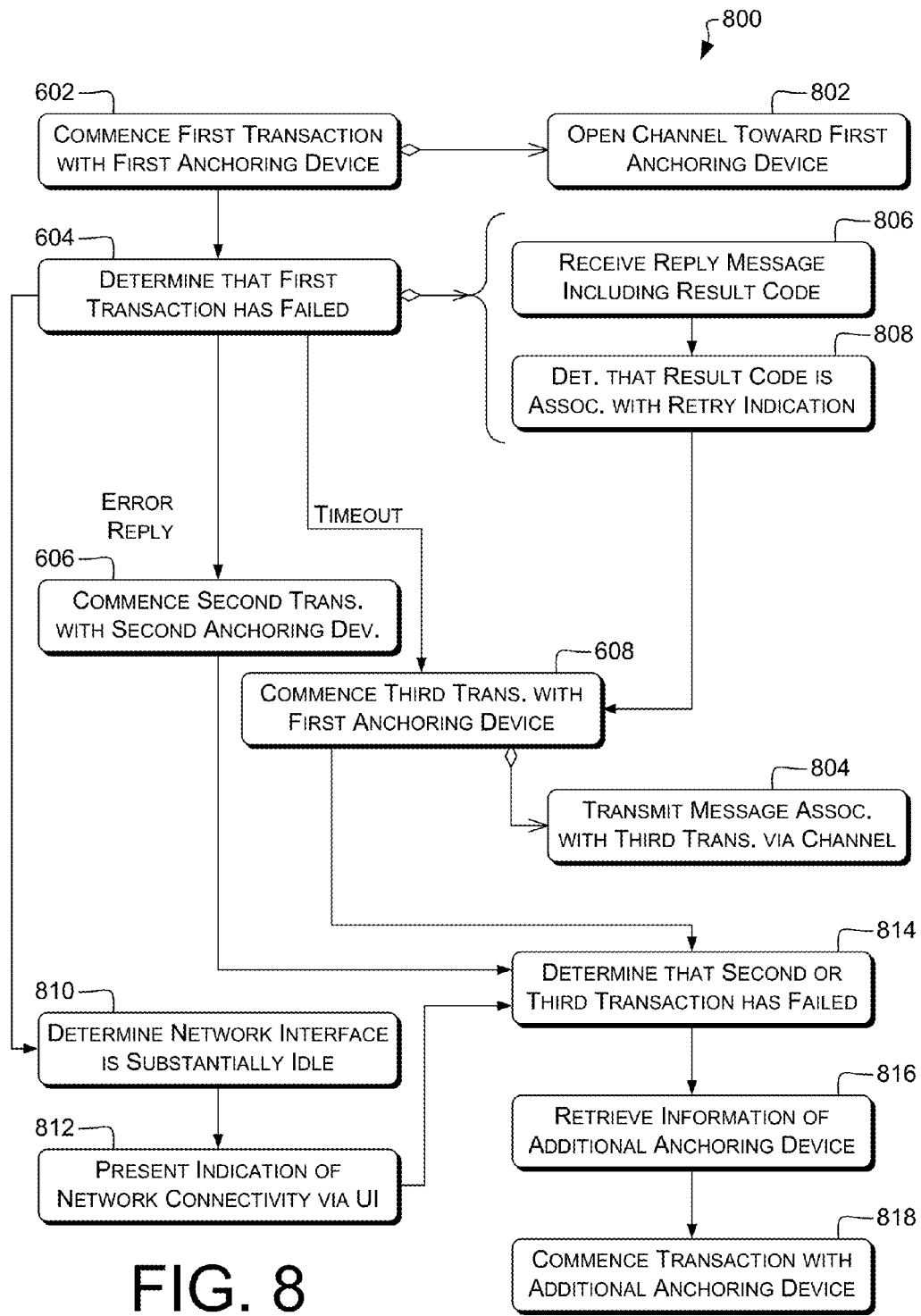
FIG. 8 illustrates an example process for registering with a network according to some implementations.

FIG. 8 illustrates an example process 800 for registering with a network, e.g., IMS 106. Process 800 can be performed by a terminal (e.g., terminal 102) of a network (e.g., telecommunication system 100). In some examples, block 602 can include block 802. In some examples, block 608 can include block 804. In some examples, block 604 can include blocks 806 and 808. In some examples, block 604 can be followed by blocks 810 and 812. In some examples, blocks 606 or 608 can be followed by block 814.

In some examples, at block 802, commencing the first transaction can include opening a channel toward the first anchoring device. For example, block 802 can include establishing a Transmission Control Protocol (TCP) connection as the channel to the first anchoring device. A SIP INVITE or other message can then be transmitted via the channel to set up a communication session.

In some examples, at block 804, commencing the third transaction can include transmitting a message associated with the third transaction via the channel. For example, a SIP INVITE can be retransmitted via the established TCP connection. An example of such a retransmission is the retransmission triggered by SIP Timer E (RFC 3261 § 17.1.2.2). In some examples, the timeout described herein with reference to block 608 can be due to a failure of a device behind the first anchoring device. Therefore, in some examples, using blocks 802 and 804, commencing the third transaction via the already-open channel to the first anchoring device can reduce the latency of registration (or other transactions, e.g., call setup) by removing the need to re-open the channel before retrying with the first anchoring device.

In some examples, at block 806, terminal 102 can receive a reply message from the first anchoring device. The reply message can include a result code. Examples are discussed above, e.g., with reference to block 502.

In some examples, at block 808, terminal 102 can determine, e.g., using a predetermined reply mapping, whether the result code is associated with the error reply or with a retry indication. Examples are discussed above, e.g., with reference to blocks 504 or 506. For example, a SIP response including a Retry-After header can be associated with a retry indication. In some examples, block 808 can be followed by block 608. In this way, in response to the result code being associated with the retry indication, the third transaction can be commenced with the first anchoring device via the network, as discussed herein with reference to block 608. Additionally or alternatively, in some examples, if the result code is not associated with a retry indication, block 808 can be followed by block 606.

In some examples using block 608 (commencing a third transaction), user-interface (UI) feedback can be provided to a user of the terminal 102. For example, subsequent to the first transaction failing (block 604) and prior to conclusion of at least one of the second transaction and the third transaction, blocks 810 and 812 can be performed.

In some examples, at block 810, terminal 102 can determine that a network interface of the terminal 102 is substantially idle. For example, block 810 can include determining that no applications executing on terminal 102 are attempting to transmit or receive network traffic, or that that no applications are scheduled to transmit or receive network traffic within a certain period of time. Block 810 can be followed by block 812.

In some examples, at block 812, terminal 102 can present, via a user interface of the terminal, an indication of network connectivity, e.g., an iconic or textual indication. Block 812 can be performed, e.g., in response to the determination at block 810 that the network interface is substantially idle. In some examples, users may respond to the absence of an indication of network connectivity by cycling the network interface or power-cycling the terminal 102. In some examples, presenting the graphic indication can permit the terminal 102 to change over, e.g., as discussed herein with reference to blocks 816 and 818, or to retry, before the user attempts those measures. This can reduce the total time elapsed required to complete the transaction (e.g., registration) in the event of a failure of an in-service anchoring device. Block 812 can be followed by block 814.

In some examples, at block 814, terminal 102 can determine that at least one of the second transaction (block 606) or the third transaction (block 608) has failed. Examples are discussed above, e.g., with reference to block 208. Additionally or alternatively, in some examples, block 814 can include determining that the second transaction has failed. Additionally or alternatively, in some examples, block 814 can include determining that the third transaction has failed.

In some examples, at block 816, terminal 102 can retrieve information of an additional anchoring device via the network. Examples are discussed above, e.g., with reference to at least one of blocks 212, 310, or 314. Block 816 can be performed in response to the determination at block 814.

In some examples, at block 818, terminal 102 can commence a transaction with the additional anchoring device via the network. Examples are discussed above, e.g., with reference to block 214. Some examples using blocks 814-818 can request additional anchoring-device addresses after a small number of transaction failures, e.g., one or two failures. This can permit more rapidly completing the transaction, e.g., in the event that the first or second anchoring devices have lost connectivity to a node behind those anchoring devices, but that connectivity to that node is available via the additional anchoring device.

Figure 9:
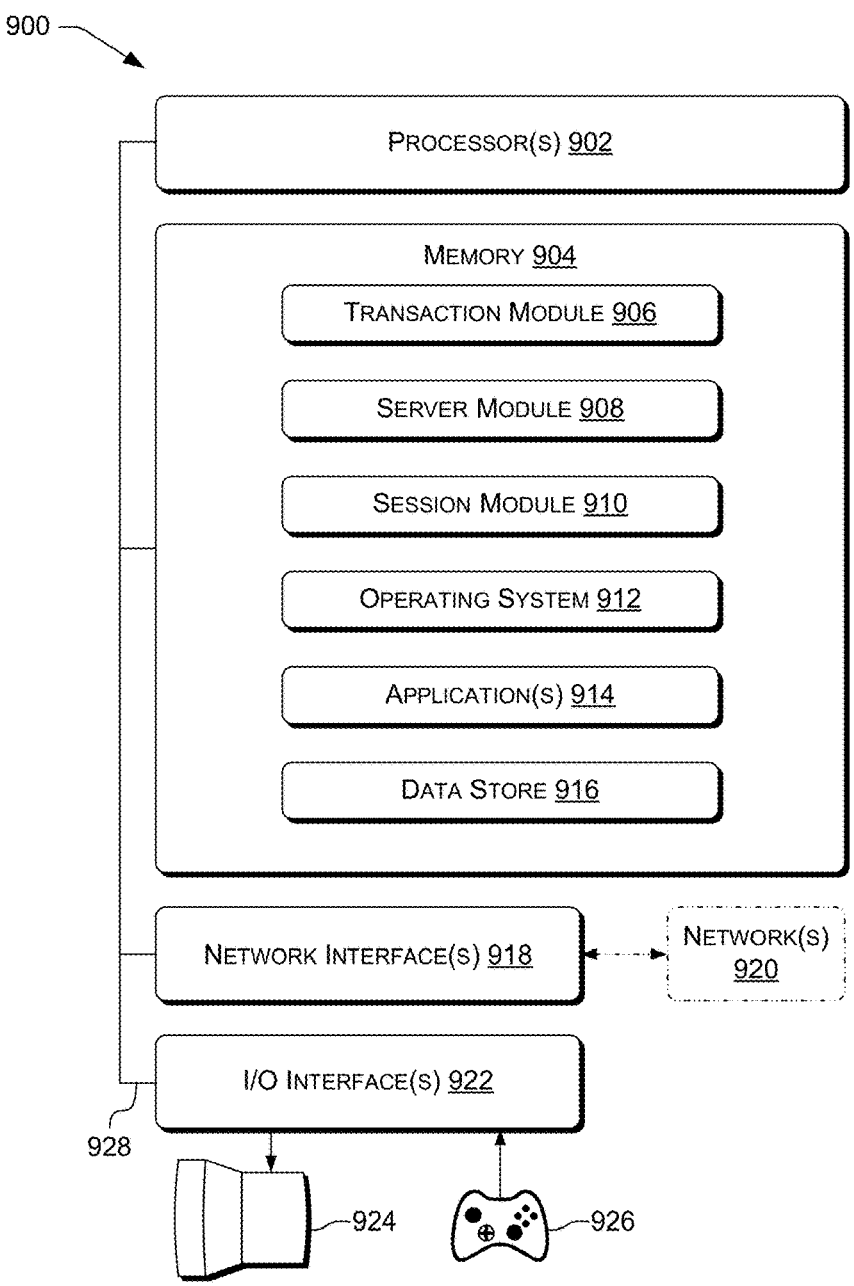
FIG. 9 is a block diagram depicting an example computing device configured to participate in retry or changeover according to some implementations.

FIG. 9 illustrates select components of an example computing device 900, which can represent terminal 102 or 138 or any of the computational components of access system 104 or IMS 106. In the illustrated example, computing device 900 includes one or more processor(s) 902 communicatively coupled with a memory 904. Memory 904 can be implemented as any combination of various types of memory components, e.g., computer-readable media (CRM) or computer storage media components. Examples of possible memory components include a random access memory (RAM), a disk drive, a mass storage component, and a non-volatile memory (e.g., solid-state disk, SSD, ROM, Flash, EPROM, EEPROM, etc.).

Processor(s) 902 can execute various instructions to control the operation of computing device 900 and to communicate with other electronic and computing devices. For example, the processor(s) 902 can be configured to execute modules of a plurality of modules, discussed below, stored on the memory 904. In some examples, the computer-executable instructions stored on the memory 904 can, upon execution, configure a computer such as a computing device 900 to perform operations described herein with reference to, e.g., the flowcharts above or modules below. The modules stored in the memory 904 can include instructions that, when executed by the one or more processor(s) 902, cause the one or more processor(s) 902 to perform operations described herein.

The memory 904 stores various information or data, including, for example, at least a transaction module 906, server module 908, session module 910, an operating system 912, or one or more other applications 914. Functionality described associated with the illustrated components or modules can be combined to be performed by a fewer number of components or modules or can be split and performed by a larger number of components or modules. The other applications 914 can include, for example, an Internet browser such as a Web browser, a media player application, a video editing application, a video streaming application, a television viewing application, and so on. In some examples, computer-executable instructions of transaction module 906, server module 908, session module 910, or applications 914 stored in at least one computer-readable medium (e.g., memory 904), when executed on processor 902 of computing device 900, direct computing device 900 to perform functions listed herein with respect to the relevant components in memory 904.

In some examples, transaction module 906 is configured to perform functions of terminal 102 described herein with reference to FIGS. 2-8. For example, transaction module 906 can commence transactions, set timers, process error codes, produce or modify transaction sets, retry, change over, or perform other functions to, e.g., register or otherwise communicate with anchoring devices. In some examples, server module 908 is configured to perform functions described herein with reference to P-CSCFs 126 or 136, application server 134, or other anchoring devices. For example, server module 908 can receive messages from terminal 102 commencing transactions, forward those messages to nodes behind the current anchoring device, process responses from those nodes, reply to terminal 102, or provide success or failure indications to terminal 102. In some examples, session module 910, e.g., of a terminal 102, is configured to set up or tear down calls, e.g., by transmitting SIP INVITE or BYE requests, respectively, or to perform other functions described herein with reference to terminal 102. For example, session module 910 can implement a voice-telephony client, an SMS, RCS, or presence client, or a client of another telephony service.

In some examples, transaction module 906 can retry or change over under various conditions. Examples of such conditions are listed in Table 2, below. This disclosure expressly envisions each possible combination of one or more of the conditions or negated conditions of the rows of Table 2. For conditions that relate to receiving a particular response, the logical negation is considered to represent receiving a response other than the particular response. For example, the logical negation of the first row, "receiving a SIP 305 response," is "receiving a response other than a SIP 305 response," as used herein.

A condition based on one or more rows of Table 2 can be expressed as one of three values per row: "T" to indicate the row must hold, "F" to indicate the row's logical negation must hold, or "X" to indicate the row is not relevant to the condition. The condition for any set of n of those three values holds if all of the "T" rows hold and if the negations of all of the "F" rows hold. For n rows, the possible number of combinations of those three values is $3^n$. The condition in which every row is "X" (no test) is excluded. This disclosure hereby sets forth $3^n-1$ individual embodiments in which respective ones of the remaining $3^n-1$ possible conditions are used by transaction module 906 as conditions to determine when to retry. This disclosure hereby sets forth $3^n-1$ individual embodiments in which respective ones of the conditions are used by transaction module 906 as conditions to determine when to change over. This disclosure hereby sets forth the very large number of embodiments in which at least one of the $3^n-1$ conditions triggers a retry, and at least one of the remaining conditions of the $3^n-1$ conditions triggers a changeover.

For example, this disclosure expressly envisions an embodiment in which a transaction is commenced with a different anchoring device in response to receipt of a response that is neither a SIP 305 nor a SIP 304 before expiration of Timer F (the intersection of the logical negations of the first three rows of Table 2). In another example, receipt of a response other than a success response or a challenge can trigger retry or changeover. In still other examples, receipt of a response other than a SIP 403 response, or other than a SIP 403 or 408 response, can trigger retry or changeover.

TABLE 2

| Condition | Comments (if any) |
|---|---|
| Expiration of a per-transaction timer | see block 508 |
| Expiration of Timer F | see blocks 312-316 |
| Receiving a response other than a challenge | see block 504 |
| Receiving a response other than a SIP 200 response | |
| Receiving a response other than a SIP 401 Unauthorized request | see block 504 |
| Receiving a response other than a success response | |
| Receiving a custom failure-indication code | see block 504 |
| Receiving a SIP 305 response | |
| Receiving a SIP 3xx response | |
| Receiving a SIP 403 response | |
| Receiving a SIP 408 response | |
| Receiving a SIP 4xx response | |
| Receiving a SIP 500 response | |
| Receiving a SIP 503 response | |
| Receiving a SIP 504 response | |
| Receiving a SIP 5xx response | |
| Receiving a SIP 6xx response | |

In the illustrated example, memory 904 includes a data store 916. In some examples, data store 916 can store information described above, e.g., transaction set(s), modified transaction set(s), anchoring-device address(es), timestamps associated with running or expired timers, list(s) of delay periods, or other data, e.g., described with reference to blocks 202, 204, 212, 312, 514, or 704. In some examples, data store 916 can store information in Table 2 or conditions (e.g., rows and T/F/X values).

In some examples, data store 916 can store operation parameters. Parameters can include a limit on the number of retries per anchoring device per action, the order of traversal of transaction sets, which conditions should trigger retry, or which conditions should trigger changeover. Parameters stored in data store 916 can be adjusted empirically to balance load across anchoring devices or provide increased robustness to, or more rapid recovery from, runtime failures of anchoring devices.

The illustrated computing device 900 can include one or more network interface(s) 918 that can permit computing device 900 to communicate with other computing devices 900 via one or more network(s) 920, e.g., access networks, serving networks, core networks, or other networks described herein. For example, network interface(s) 918 can facilitate establishing or receiving wired or wireless network service. In some examples, at least one of the network interface(s) 918 can include, but is not limited to, a radio or transceiver for cellular (3G, 4G, or other), WI-FI, ultra-wideband (UWB), BLUETOOTH, satellite, or other wireless transmissions. At least one of the network interface(s) 918 can include a wired I/O interface, such as an Ethernet interface, a serial interface, a Universal Serial Bus (USB) interface, an INFINIBAND interface, or other wired interfaces. In some examples, a network interface 918 is an example of a communications interface. In some examples, an interface between processor(s) 902 and memory 904, e.g., a memory-bus controller, is an example of a communications interface. Example communications interfaces herein can be connectable with network(s).

The illustrated computing device 900 can include one or more input/output (I/O) interfaces 922, that can include, or be communicatively connected with, for example, a display device 924, enabling computing device 900 to present visual content, e.g., as discussed herein with reference to block 812. In example implementations, I/O interface 922 provides signals to a touchscreen or other display device.

I/O interface(s) 922 can additionally or alternatively include, or be communicatively connected with, for example, a user-operable input device 926 (graphically represented as a gamepad), enabling a user to, e.g., direct computing device 900 to set up sessions with specific destinations. User-operable input device 926 can include, e.g., a touch sensor over a touchscreen, a user-operable button, switch, or other physical input control, an optical sensor, e.g., to detect finger position with respect to a screen, a mouse, a trackball, a joystick, or a pointing stick such as a TRACKPOINT. In some examples, user-operable input device 926 can represent a "Send" control or a call-acceptance control.

Although shown separately, some of the components of computing device 900 can be implemented together in a single hardware device, such as in a Field-Programmable Gate Array (FPGA), an Application Specific Integrated Circuit (ASIC), Application-specific Standard Product (ASSP), System-On-a-Chip system (SoC), Complex Programmable Logic Device (CPLD), Digital Signal Processor (DSP), or other type of customizable processor. For example, a processor 902 can represent a hybrid device, such as a device from ALTERA (INTEL) or XILINX that includes a CPU core embedded in an FPGA fabric. These or other hardware logic components can operate independently or, in some instances, can be driven by a CPU. In some examples, processor 902 can be or include one or more single-core processors, multi-core processors, central processing unit (CPUs), graphics processing units (GPUs), general-purpose GPUs (GPGPUs), or hardware logic components configured, e.g., via specialized programming from modules or APIs, to perform functions described herein.

In some examples, a system bus 928 typically connects the various components within computing device 900. A system bus 928 can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, e.g., a Mezzanine bus. In some examples, a communications interface can include interface electronics permitting communication via system bus 928.

Any of the components illustrated in FIG. 9 can be implemented in hardware, software, or a combination of hardware and software. Further, any of the components illustrated in FIG. 9, e.g., memory 904, can be implemented using any form of computer-readable media that is accessible by computing device 900, either locally or remotely, including over a network 920. Computer-readable media includes two types of computer-readable media, namely computer storage media and communications media. Computer storage media (e.g., a computer storage medium) includes tangible storage units such as volatile memory, nonvolatile memory, or other persistent or auxiliary computer storage media, removable and non-removable computer storage media implemented in any method or technology for storage of information such as computer-readable instructions, data structures, program modules, or other data.

Computer storage media includes tangible, non-transitory, or other physical forms of media included in a device or hardware component that is part of a device or external to a device. Tangible computer-readable media, e.g., computer storage media, can include volatile and nonvolatile, removable and non-removable media implemented in any method or technology for storage of information, such as computer readable instructions, data structures, program modules, or other data. Example computer storage media can include, but are not limited to, random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, or storage media that can be used to store and maintain information for access by a computing device 900.

In contrast to computer storage media, communication media can embody computer-readable instructions, data structures, program modules, or other data in a modulated data signal, such as a carrier wave, or other transmission mechanism. As defined herein, computer storage media does not include communication media. In some examples, memory 904 can be or include computer storage media.

Computing device(s) 900, e.g., terminals 102 or 138, may be implemented as any suitable mobile terminals configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the terminals 102 or 138 as being "mobile" or "wireless," (e.g., configured to be carried and moved around), it is to be appreciated that the terminals 102 or 138 may represent various types of communication devices that are generally stationary as well, such as televisions, desktop computers, game consoles, set top boxes, and the like. User equipment can include user cellular equipment or other telecommunications or terminals communicatively connectable with other terminals via one or more routing device(s), e.g., components of IMS 106. Mobile phones and copper-loop landline phones can be examples of user equipment.

Example networks, e.g., access networks of access system 104, can include LTE, WIFI, GSM EDGE Radio Access Network (GERAN), UMTS Terrestrial Radio Access Network (UTRAN), and other cellular access networks. Access networks can provide wide-area wireless coverage using a technology such as GSM, Code Division Multiple Access (CDMA), UMTS, LTE, or the like. Example access networks can at least one of include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), VoIP, VoLTE, IEEE 802-series protocols such as IEEE 802.15.1 ("Bluetooth"), wireless microwave access (WI-MAX), and WIFI, and/or any future IP-based network technology or evolution of an existing IP-based network technology. A core network can include any of these types of networks or networks designed to interoperate with access networks, e.g., an Evolved Packet Core (EPC) or IMS 106 network. In some examples, network communications with terminals 102 or 138 can additionally or alternatively be performed using non-wireless networks 920, such as electrical wired connections (e.g., Plain Old Telephone Service, POTS, or PSTN lines), optical (e.g., Synchronous Optical NETwork, SONET) technologies, Asynchronous Transfer Mode (ATM), and the like.

In some examples, networks, e.g., access networks or core networks, can carry voice or data. For example, a data network can carry voice traffic using Voice over Internet Protocol (VoIP) or other technologies as well as data traffic, or a cellular network can carry data packets using High Speed Packet Access (HSPA), LTE, or other technologies as well as voice traffic. Some cellular networks carry both data and voice in a PS format. For example, many LTE networks carry voice traffic in data packets according to the voice-over-LTE (VoLTE) standard. Various examples herein provide origination and termination of, e.g., operator-grade voice calls on, e.g., networks using CS transports or mixed VoLTE/3G transports, or on terminals 102 including original equipment manufacturer (OEM) handsets and non-OEM handsets.

EXAMPLE CLAUSES

A: A terminal, comprising: a processor; a communications interface communicatively connectable with a network; and a computer storage medium having thereon computer-executable instructions, the computer-executable instructions upon execution by the processor configuring the terminal to perform operations comprising: receiving information of at least two anchoring devices; determining a transaction set in which each of the anchoring devices is associated with a respective number of transactions of the transaction set; for each transaction of the transaction set: commencing the transaction with the respective anchoring device via the network; and determining that the transaction has failed; subsequently, receiving information of an additional anchoring device via the network; and commencing a transaction with the additional anchoring device via the network.

B: The terminal according to paragraph A, the operations further comprising determining the transaction set including the respective number of transactions with a first anchoring device of the at least two anchoring devices, followed by the respective number of transactions with a second, different anchoring device of the at least two anchoring devices.

C: The terminal according to paragraph A or B, the operations further comprising determining the transaction set including at least one transaction with a first anchoring device arranged between two transactions with a second, different anchoring device of the at least two anchoring devices.

D: The terminal according to any of paragraphs A-C, the operations further comprising determining the transaction set including a predetermined number of the transactions with each of the at least two anchoring devices.

E: The terminal according to any of paragraphs A-D, the operations further comprising: before commencing any transaction of the transaction set, setting a timer; and receiving the information of the additional anchoring device before the timer elapses.

F: The terminal according to any of paragraphs A-E, the operations further comprising, in response to the determining that a last transaction of the transaction set has failed, transmitting, via the network, a request for the information of the additional anchoring device.

G: The terminal according to any of paragraphs A-F, the operations for commencing each transaction of the transaction set comprising transmitting a Session Initiation Protocol (SIP) REGISTER request to a respective Proxy Call Session Control Function (P-CSCF).

H: A method, comprising, by a terminal of a network: commencing a first transaction with a first anchoring device via the network; determining that the first transaction has failed; in response to the failure of the first transaction, commencing a second transaction with a second, different anchoring device via the network; determining that the second transaction has failed; and in response to the failure of the second transaction, commencing a third transaction with the first anchoring device via the network.

I: The method according to paragraph H, further comprising: determining that the third transaction has failed; and in response to the failure of the third transaction, commencing a fourth transaction with the second anchoring device via the network.

J: The method according to paragraph I, further comprising: determining a list of delay periods based at least in part on a common scale, a common base, and respective, different exponents, wherein the respective exponent for each delay period of the list other than a first delay period is higher than the respective exponent for a respective preceding delay period of the list; before commencing the second transaction, the third transaction, or the fourth transaction, waiting for expiration of a next delay period in order through the list of delay periods.

K: The method according to any of paragraphs H-J, further comprising: receiving a reply message associated with the first anchoring device, the reply message comprising a result code; determining a failure status associated with the result code using a predetermined result mapping; and determining that the first transaction has failed in response to the failure status indicating a transient-failure condition.

L: The method according to any of paragraphs H-K, further comprising determining that the first transaction has failed due to a timeout.

M: The method according to any of paragraphs H-L, wherein commencing each of the first transaction, the second transaction, and the third transaction comprises transmitting a respective Session Initiation Protocol (SIP) REGISTER request to the respective anchoring device, and wherein each of the first anchoring device and the second anchoring device comprises a respective Proxy Call Session Control Function (P-CSCF).

N: A computer-readable medium including instructions to, when executed by at least processor, cause the at least one processor to perform operations comprising: commencing a first transaction with a first anchoring device via a network; determining that the first transaction has failed; in response to the first transaction failing by receipt of an error reply, commencing a second transaction with a second, different anchoring device via the network. in response to the first transaction failing due to a timeout, commencing a third transaction with the first anchoring device via the network.

O: The computer-readable medium according to paragraph N, the operations further comprising: determining a transaction set comprising a respective number of transactions with each anchoring device of a plurality of anchoring devices, wherein the transaction set comprises the first transaction and at least one transaction with the second anchoring device; in response to the error reply, removing any transactions with the first anchoring device from the transaction set to provide a modified transaction set; determining that the second transaction has failed; subsequently, selecting a fourth transaction from the modified transaction set; and commencing the fourth transaction with the respective anchoring device via the network.

P: The computer-readable medium according to paragraph N or O, the operations further comprising: receiving a reply message from the first anchoring device, the reply message comprising a result code; determining, using a predetermined reply mapping, that the result code is associated with a retry indication; and commencing the third transaction with the first anchoring device via the network.

Q: The computer-readable medium according to any of paragraphs N-P, the operations further comprising: determining that at least one of the second transaction or the third transaction has failed; retrieving information of an additional anchoring device via the network; and commencing a transaction with the additional anchoring device via the network.

R: The computer-readable medium according to any of paragraphs N-Q, the operations further comprising, subsequent to the first transaction failing and prior to conclusion of at least one of the second transaction and the third transaction: determining that a network interface of the terminal is substantially idle; and presenting, via a user interface of the terminal, an indication of network connectivity.

S: The computer-readable medium according to any of paragraphs N-R, wherein: the operations for commencing the first transaction comprise operations for opening a channel toward the first anchoring device; and the operations for commencing the third transaction comprise operations for transmitting a message associated with the third transaction via the channel T: The computer-readable medium according to any of paragraphs N-S, wherein the operations for commencing each of the first transaction, the second transaction, and the third transaction comprise operations for transmitting a respective Session Initiation Protocol (SIP) REGISTER request to a respective Proxy Call Session Control Function (P-CSCF).

U: A computer-readable medium, e.g., a computer storage medium, as recited in any of paragraphs A-G.

V: A computer-readable medium, e.g., a computer storage medium, having thereon computer-executable instructions, the computer-executable instructions upon execution configuring a computer to perform operations as any of paragraphs H-M recites.

W: A device comprising: a processor; and a computer-readable medium, e.g., a computer storage medium, having thereon computer-executable instructions, the computer-executable instructions upon execution by the processor configuring the device to perform operations as any of paragraphs H-M recites.

X: A system comprising: means for processing; and means for storing having thereon computer-executable instructions, the computer-executable instructions including means to configure the system to carry out a method as any of paragraphs H-M recites.

Y: A device comprising: a processor; and a computer-readable medium, e.g., a computer storage medium, as any of paragraphs N-T recites.

Z: A system comprising: means for processing; and means for storing having thereon computer-executable instructions, the computer-executable instructions including instructions as any of paragraphs N-T recites.

CONCLUSION

Various aspects described above permit more efficiently establishing or maintaining communications between terminal 102 and anchoring device(s), e.g., during a period in which not all anchoring devices are accessible from terminal 102. Technical effects of various examples can include reducing latency for registration upon device or interface activation, for call setup, or for re-registration upon failure of an anchoring device, compared to prior schemes. Various examples can reduce peak load on anchoring device(s), reducing the probability of widespread loss of service due to network overload.

Example data transmissions described herein, example data flows in FIG. 1, and example blocks in the process diagrams of FIGS. 2-8 represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the transmissions or operations are described is not intended to be construed as a limitation, and any number of the described transmissions or operations can be combined in any order and/or in parallel to implement the processes. Moreover, structures or operations described with respect to a single server or device (e.g., FIG. 9) can be performed by each of multiple devices, independently or in a coordinated manner, except as expressly set forth herein.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances. Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

As used herein, a message described as "associated with" a data item can include that data item, or can include information that, alone or in combination with other information, permits retrieval of that data item. For example, a message can be associated with a destination network address, e.g., by including the destination network address or by including a destination hostname that can be used to retrieve a corresponding destination network address from a database (e.g., the Internet Domain Name System, DNS).

Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" and the phrase "and/or" are used herein in an inclusive sense unless specifically stated otherwise. Accordingly, conjunctive language such as, but not limited to, at least the phrases "X, Y, or Z," "at least X, Y, or Z," "at least one of X, Y or Z," and/or any of those phrases with "and/or" substituted for "or," unless specifically stated otherwise, is to be understood as signifying that an item, term, etc., can be either X, Y, or Z, or a combination of any elements thereof (e.g., a combination of XY, XZ, YZ, and/or XYZ). Moreover, in the claims, any reference to a group of items provided by a preceding claim clause is a reference to at least some of the items in the group of items, unless specifically stated otherwise.

Furthermore, although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A terminal, comprising:
   a processor;
   a communications interface communicatively connectable with a network; and
   a non-transitory computer storage medium having thereon computer-executable instructions, the computer-executable instructions upon execution by the processor configuring the terminal to perform operations comprising:
   receiving information of at least two anchoring devices;
   determining a transaction set in which each of the anchoring devices is associated with a respective number of transactions of the transaction set;
   for each transaction of the transaction set:
      commencing the transaction with the respective anchoring device via the network; and
      determining that the transaction has failed;
   requesting information of an additional anchoring device via the network, the additional anchoring device being different from the at least two anchoring devices;
   in response to the requesting, receiving the information of the additional anchoring device;
   commencing a transaction with the additional anchoring device via the network;
   determining a list of delay periods based at least in part on a common scale, a common base, and respective, different exponents, wherein the respective exponent for each delay period of the list other than a first delay period is higher than the respective exponent for a respective preceding delay period of the list; and
   before commencing the one of the transactions with the anchoring devices or the transaction with the additional anchoring device, waiting for expiration of a next delay period in order through the list of delay periods.

2. The terminal according to claim 1, the operations further comprising determining the transaction set including the respective number of transactions with a first anchoring device of the at least two anchoring devices, followed by the respective number of transactions with a second, different anchoring device of the at least two anchoring devices.

3. The terminal according to claim 1, the operations further comprising determining the transaction set including at least one transaction with a first anchoring device arranged between two transactions with a second, different anchoring device of the at least two anchoring devices.

4. The terminal according to claim 1, the operations further comprising determining the transaction set including a predetermined number of the transactions with each of the at least two anchoring devices.

5. The terminal according to claim 1, the operations further comprising:
   before commencing any transaction of the transaction set, setting a timer; and
   receiving the information of the additional anchoring device before the timer elapses.

6. The terminal according to claim 1, the operations for commencing each transaction of the transaction set comprising transmitting a Session Initiation Protocol (SIP) REGISTER request to a respective Proxy Call Session Control Function (P-CSCF).

7. A method comprising, by a terminal of a network:
receiving information of at least two anchoring devices;
commencing a first transaction with a first anchoring device of the at least two anchoring devices via the network;
determining that the first transaction has failed;
in response to the failure of the first transaction, commencing a second transaction with a second, different anchoring device of the at least two anchoring devices via the network;
determining that the second transaction has failed;
in response to the failure of the second transaction, commencing a third transaction with the first anchoring device via the network;
subsequently, and in response to each of the first transaction, second transaction, and third transaction failing, requesting information of an additional anchoring device via the network, the additional anchoring device being different from the at least two anchoring devices;
in response to the requesting, receiving the information of the additional anchoring device;
commencing a fourth transaction with the additional anchoring device via the network;
determining a list of delay periods based at least in part on a common scale, a common base, and respective, different exponents, wherein the respective exponent for each delay period of the list other than a first delay period is higher than the respective exponent for a respective preceding delay period of the list; and
before commencing the second transaction, the third transaction, or the fourth transaction, waiting for expiration of a next delay period in order through the list of delay periods.

8. The method according to claim 7, wherein commencing each of the first transaction, the second transaction, and the third transaction comprises transmitting a respective Session Initiation Protocol (SIP) REGISTER request to the respective anchoring device, and wherein each of the first anchoring device and the second anchoring device comprises a respective Proxy Call Session Control Function (P-CSCF).

9. A non-transitory computer-readable medium including instructions that, when executed by at least one processor, cause the at least one processor to perform operations comprising:
commencing a first transaction with a first anchoring device via a network;
determining that the first transaction has failed;
in response to the first transaction failing by receipt of an error reply, commencing a second transaction with a second, different anchoring device via the network;
in response to the first transaction failing due to a timeout, commencing a third transaction with the first anchoring device via the network;
determining a transaction set comprising a respective number of transactions with each anchoring device of a plurality of anchoring devices, wherein the transaction set comprises the first transaction and at least one transaction with the second anchoring device;
in response to the error reply, removing any transactions with the first anchoring device from the transaction set to provide a modified transaction set;
determining that the second transaction has failed;
subsequently, selecting a fourth transaction from the modified transaction set; and
commencing the fourth transaction with the respective anchoring device via the network.

10. The non-transitory computer-readable medium according to claim 9, the operations further comprising:
determining that at least one of the second transaction or the third transaction has failed:
retrieving information of an additional anchoring device via the network; and
commencing a transaction with the additional anchoring device via the network.

11. The non-transitory computer-readable medium according to claim 9, the operations further comprising, subsequent to the first transaction failing and prior to conclusion of at least one of the second transaction and the third transaction:
determining that a network interface of the terminal is substantially idle; and
presenting, via a user interface of the terminal, an indication of network connectivity.

12. The non-transitory computer-readable medium according to claim 9, wherein:
the operations for commencing the first transaction comprise operations for opening a channel toward the first anchoring device; and
the operations for commencing the third transaction comprise operations for transmitting a message associated with the third transaction via the channel.

13. The non-transitory computer-readable medium according to claim 9, wherein the operations for commencing each of the first transaction, the second transaction, and the third transaction comprise operations for transmitting a respective Session Initiation Protocol (SIP) REGISTER request to a respective Proxy Call Session Control Function (P-CSCF).

* * * * *